(No Model.) 2 Sheets—Sheet 2.
E. L. HAY.
HAY LOADER.
No. 381,779. Patented Apr. 24, 1888.
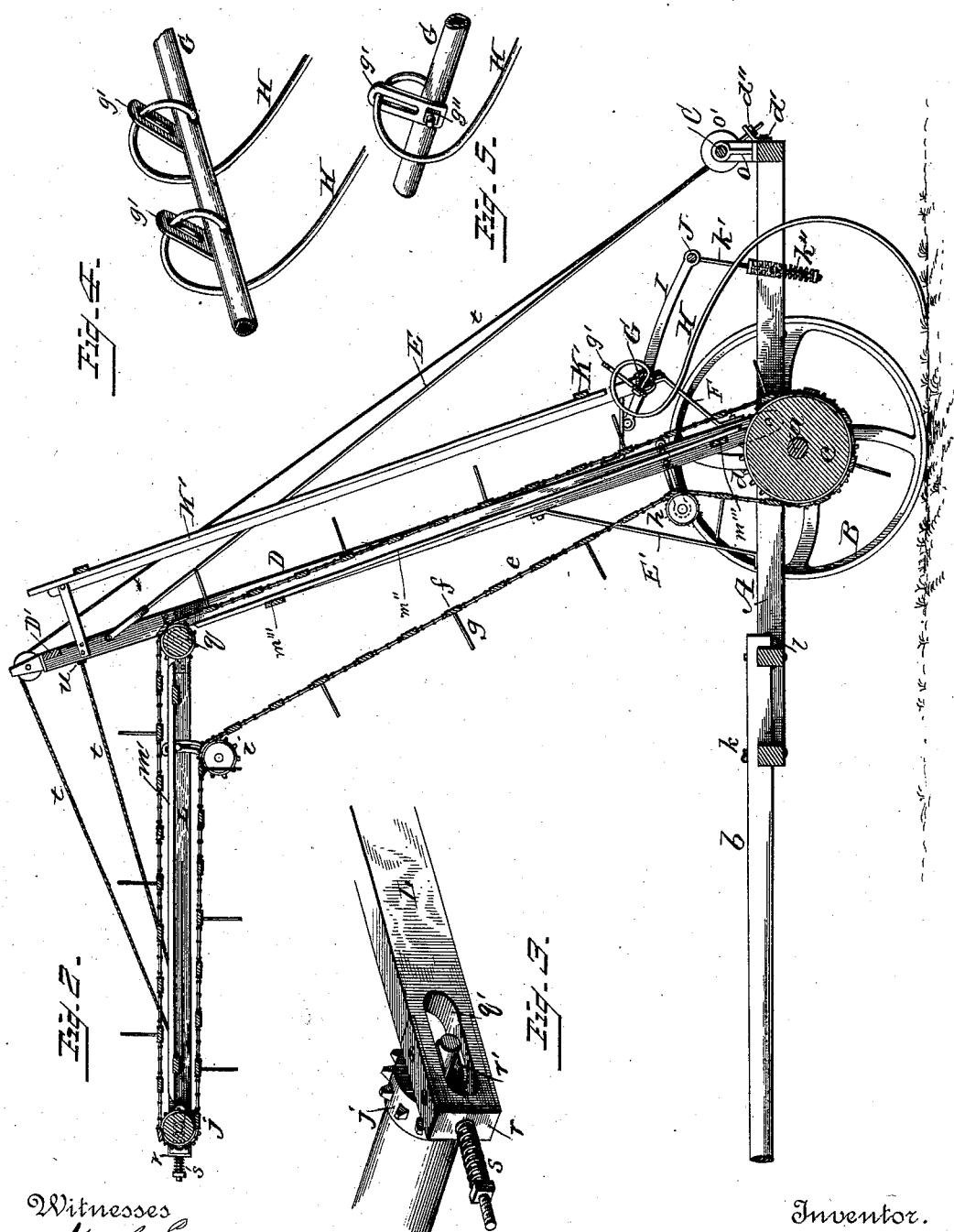
Witnesses
Inventor.
Edwin L. Hay.
By his Attorney.

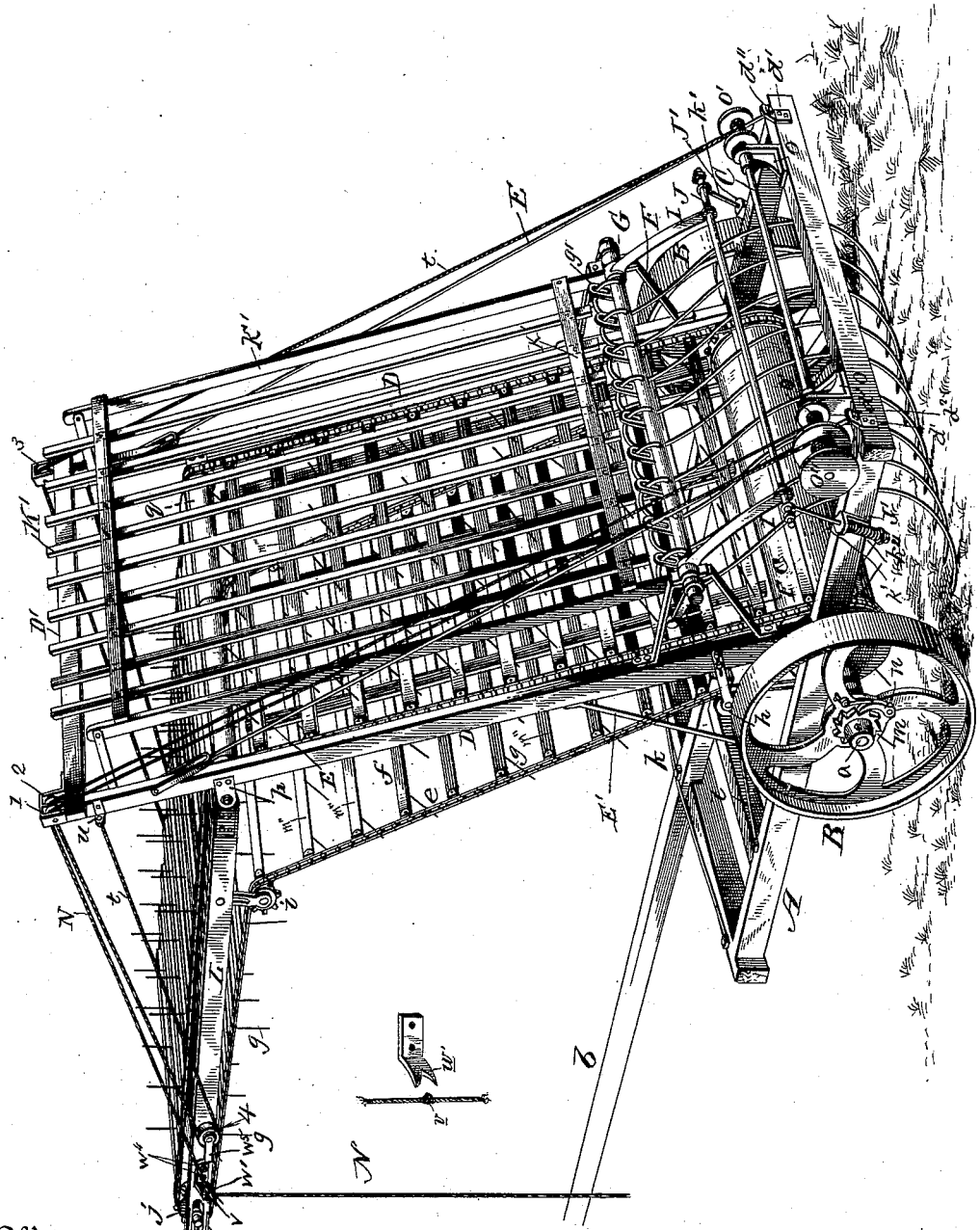

UNITED STATES PATENT OFFICE.

EDWIN L. HAY, OF LILLY, ILLINOIS.

HAY-LOADER.

SPECIFICATION forming part of Letters Patent No. 381,779, dated April 24, 1888.

Application filed July 21, 1887. Serial No. 244,894. (No model.)

*To all whom it may concern:*

Be it known that I, EDWIN L. HAY, a citizen of the United States, residing at Lilly, in the county of Tazewell and State of Illinois, have invented certain new and useful Improvements in Hay Rakes and Loaders; and I do hereby declare that the following is a full, clear, and exact description of the same, reference being had to the annexed drawings, making a part of this specification, and to the letters and figures of reference marked thereon.

Figure 1 of the drawings is a perspective view of my improved hay rake and loader. Fig. 2 is a sectional elevation thereof. Fig. 3 is a perspective view in detail of the upper belt-roller and supporting-frame. Figs. 4 and 5 are detail views in perspective, showing the manner of connecting the teeth to the rake-head.

The present invention has relation to certain new and useful improvements in hay rakes and loaders, and the object thereof is to provide such a machine that will successfully elevate the hay and load it on a wagon; and it consists in the details of construction substantially as shown in the drawings and hereinafter described and claimed.

In the accompanying drawings, A represents a suitable frame supported by the axle $a$ and wheels B, said frame having a suitable tongue, $b$, to which the team is connected. The axle $a$ has rigidly connected to it a drum, $c$, to the ends of which are sprockets $d$, which engage endless chains $e$, said chains having connected to them transverse slats $f$ at their ends, provided with suitable teeth, $g$, which together constitute the carrier, said carrier passing over the several rollers $h\ i\ j$, the two latter also having sprockets, with which engage the chains $e$. The tongue $b$ is braced at its point of connection with the frame A by means of the truss-rods $k\ l$, one extending above and the other under the tongue.

To the axle $a$ at its ends are rigidly connected ratchets $m$, with which engage suitable pawls, $n$, pivoted to the wheels B so that the axle can be made to turn with the wheels or independently thereof, as found desirable.

Secured to the rear cross-bar of the frame are the lugs $o$, in which is journaled the transverse shaft C, formed at each end with a spool, $o'$, as shown, and at one end outside of the spool with a drum, $o''$.

Pivoted to the main frame, substantially over the axle, are the standards D, connected at their upper ends by the cross-bar D', to which are secured brackets carrying the sheaves 1, 2, and 3. These standards and cross-bar constitute the elevator-frame. E are brace-rods rigidly attached at their upper ends to the standards D, while their other ends are screw-threaded and passed through openings in the lugs $d'$ secured to the rear cross-bar of the main frame and provided with adjusting-nuts $d^2$, by means of which the inclination of the standards may be varied, as desired.

To the rear side of the standards D are the brackets F, in which is journaled the rake-head G, to which are secured the steadying-clips $g'$, slotted at their upper end, as shown in Figs. 4 and 5. The rake-teeth H are screw-threaded at one end, which passes through holes in the rake-head and through coincident holes in the clips $g'$ and receive nuts $g^2$, the coil part of the teeth passing through the slots in the clips. This construction is clearly shown in Figs. 4 and 5 in the drawings.

The rake-head is connected by means of the rocker-arms I with the shaft J, which is yieldingly connected with the main frame of the machine. In the drawings this yielding connection is provided for in the following manner: To the side bars of the frame are secured the lugs J', through holes in which pass rods $k'$, which at one end are loosely sleeved upon the shaft J and their other ends passed through holes in the lugs J' and provided with suitable nuts, between which and the said lugs surrounding said rods are the coiled springs $k^2$. This shaft J bears on the rake-teeth and serves to hold them to their work and yet allow them to yield in case they meet with an obstruction.

E' are braces secured at one end to the frame A, and at the other to the standards D, for the purpose of bracing the latter.

$m''\ m'''$ are slats connected to the chains $e$ and serving to spread the same. Attached at one end to the bracket F, in which is journaled the said rake-head, and at the other ends to the upper ends of the standards D, is the slatted guard K', arranged substantially parallel to the travel of the carrier, to prevent the hay from falling backward. The rollers $h$ $i$ are carried by brackets, which are adjustably secured to their respective supports.

To the standards D, and extending to the front thereof, are the lugs or brackets $p$, in which is journaled the drum $q$, provided in its outer ends with sprockets, which engage the carrier-chains. Pivotally secured to these lugs or brackets is the carrier-frame L, between the side bars of which are supported the slats $m'$, which serve to prevent sagging of the carrier. The upper ends of the side bars of this frame are provided with elongated slots $q'$, and over the end of the side bars are secured metal caps $r$, which serve to prevent splitting of said side bars. Passed through openings in the ends of said caps are the hooks $r'$, the outer ends of which are screw-threaded and provided with suitable adjusting-nuts, (see Fig. 3,) between which and said caps are the coiled springs $s$. In the hooked ends of these hooks are journaled the trunnions of the drum $j$. By this means provision is made for keeping proper tension on the carrier-chains, no matter in what position the carrier-chains may be placed.

$t$ are cords or chains secured at one end to the spools on the shaft C, and, after passing over the sheaves 2 and 3 on the cross-bar $D'$, pass down to and over sheaves 4, journaled in the arms $w^5$ on the side bars of the carrier-frame, and back, and are secured to the standards D, near their upper ends, as shown at $u$.

The hoisting-cord N is wound around the drum $o''$, thence passing over the sheave 1 on the cross-bar $D'$, and is provided with a knot, $v$, which, when the carrier-frame is adjusted to the proper position by means of the mechanism above described, engages a claw, $w'$, secured to one end of the side bars of the carrier-frame by means of the screws or nails $w^4$, which also secure the arms $w^5$ in place, and thus holds the said frame in its adjusted position.

In the drawings the carrier-frame is shown elevated. When it is desired to lower the same, the knot in the cord N is disengaged from the claw $w'$, when the frame falls down, the cord N winding upon the drum $o''$, and the cords $t$ unwinding from their spools and serving to gradually lower the frame and prevent its going down suddenly.

The operation is similar to that of previous devices of this class, the novelty in the present case residing solely in the details of construction, and a description of the operation thereof is therefore not deemed necessary. When the cord N is released from its engagement with the claw, the carrier-frame falls of its own weight. The cords $t$ being fast at one end to the frame D and passed around the pulleys 4 on the frame L, and the other end fast to the shaft C, the said cords $t$ unwind from their spools, and the cord N being fast at one end to its spool on the same shaft, but passed around in the other direction so as to wind as the cords $t$ unwind, the cord N must be wound on its spool as the frame L falls and the cords $t$ unwind. When the carrier-frame L is down and the cords $t$ unwound, and the hoisting-cord N wound to elevate the frame, the free end of the cord is pulled on by hand. The cord in unwinding rotates the shaft upon which it is wound, thereby winding the cords $t$ thereupon, and they in turn elevating the frame, as is readily understood. When the frame is elevated at any height, the cord N is caught in the claw $w'$ and the adjustment maintained.

What I claim as new, and desire to secure by Letters Patent, is—

The combination, with the rake-head and the main frame and the curved rake teeth carried by said rake-head, of the brackets F, secured to the standards of the elevator-frame, said rake-head being journaled in said brackets, the rod J, resting on the rake-teeth between their free ends and the rake-head, rocker-arms I, connecting said rod and rake-head, the lugs $J'$, secured to the side bars of the main frame, the rods $k'$, sleeved at one end on said shaft J, the other end passed through said lugs, the adjusting-nuts on the ends of said rods, and the coil-springs $k^2$ on said rods between said nuts and lugs, substantially as shown and described.

In testimony that I claim the above I have hereunto subscribed my name in the presence of two witnesses.

EDWIN L. HAY.

Witnesses:
B. S. HEYERS,
C. A. KUHL.